US007680267B2

(12) United States Patent
Bradford et al.

(10) Patent No.: US 7,680,267 B2
(45) Date of Patent: Mar. 16, 2010

(54) HEADSET WITH A RETRACTABLE SPEAKER PORTION

(75) Inventors: Eric R. Bradford, Campbell, CA (US); Jay Wilson, Portola Valley, CA (US); Claude Zellweger, San Francisco, CA (US)

(73) Assignee: Plantronics, Inc., Santa Cruz, CA (US)

( * ) Notice: Subject to any disclaimer, the term of this patent is extended or adjusted under 35 U.S.C. 154(b) by 1290 days.

(21) Appl. No.: 11/173,398

(22) Filed: Jul. 1, 2005

(65) Prior Publication Data

US 2007/0025581 A1 Feb. 1, 2007

(51) Int. Cl.
*H04M 1/00* (2006.01)
*H04M 9/00* (2006.01)
*H04R 25/00* (2006.01)

(52) U.S. Cl. ..................... 379/430; 381/370; 455/575.2

(58) Field of Classification Search ................. 379/430, 379/420.01–420.04; 381/370, 374–376, 381/380; 455/575.2, 569.1, 569.2
See application file for complete search history.

(56) References Cited

U.S. PATENT DOCUMENTS 6,795,718 B2 * 9/2004 Bae ......................... 455/575.2
2002/0104545 A1 8/2002 Ma
2003/0132884 A1 7/2003 Ragner et al.
2003/0224839 A1 * 12/2003 Takahashi et al. ........ 455/575.2
2004/0185919 A1 * 9/2004 Yoo ........................ 455/575.1

FOREIGN PATENT DOCUMENTS

EP 1333649 A1 8/2003

* cited by examiner

*Primary Examiner*—Tuan D Nguyen
(74) *Attorney, Agent, or Firm*—Haynes Boone, LLP; David Park

(57) ABSTRACT

An earbud headset, a handset including the same, and methods of operating the headset and handset are provided. In one embodiment, an earbud headset includes a speaker portion that is retractable into and extendable from a base portion, thereby allowing for a thin profile form factor. Advantageously, the earbud headset allows for more convenient storage and/or integration with a handset such that a user may carry the handset and headset much like a single item.

27 Claims, 7 Drawing Sheets

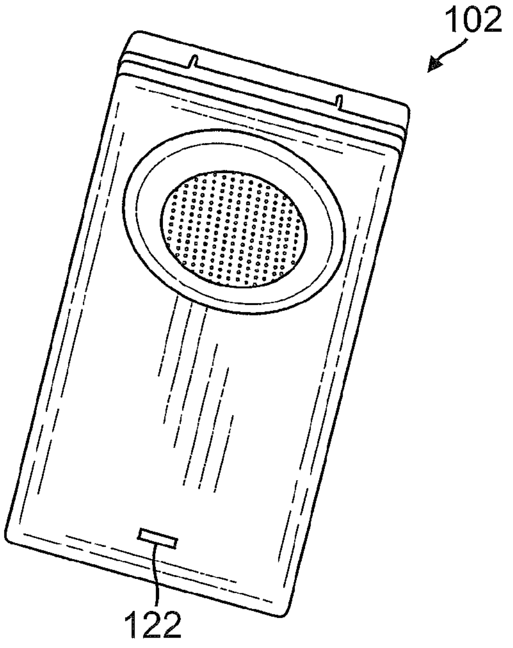
FIG. 2A
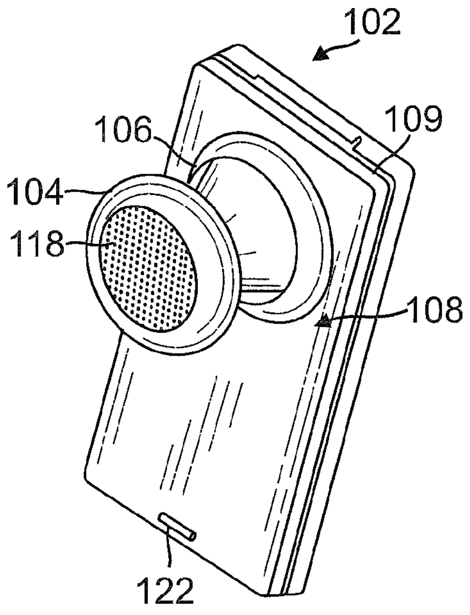
FIG. 2B
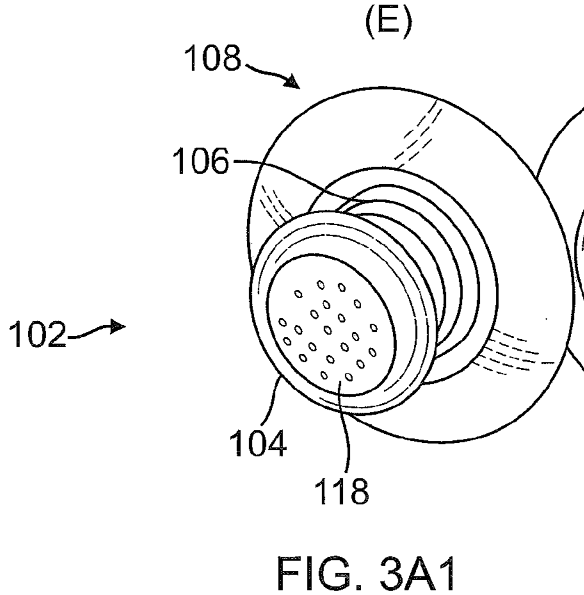
FIG. 3A1
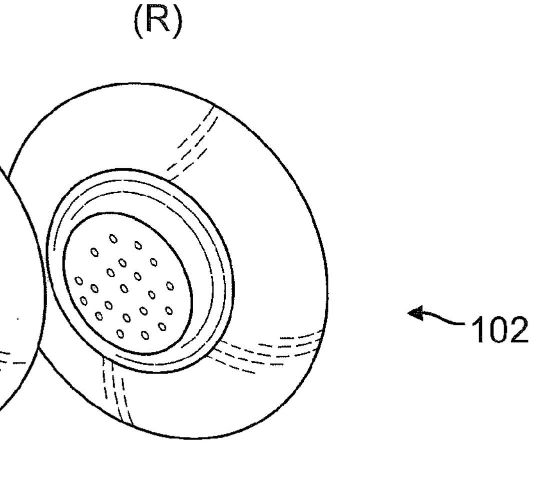
FIG. 3A2

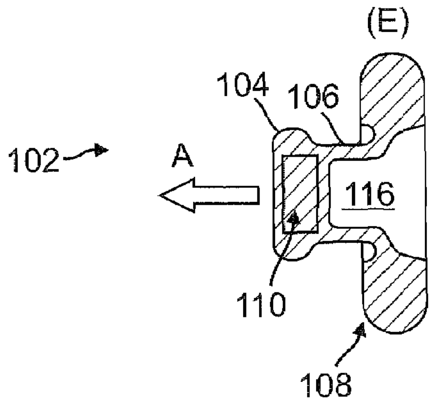
FIG. 3B1
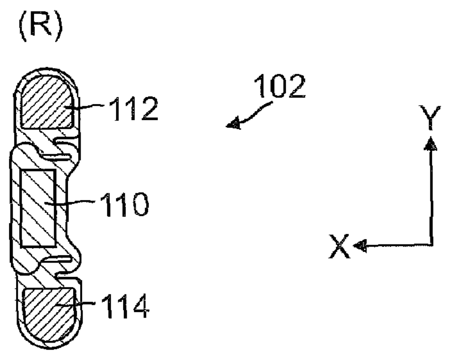
FIG. 3B2
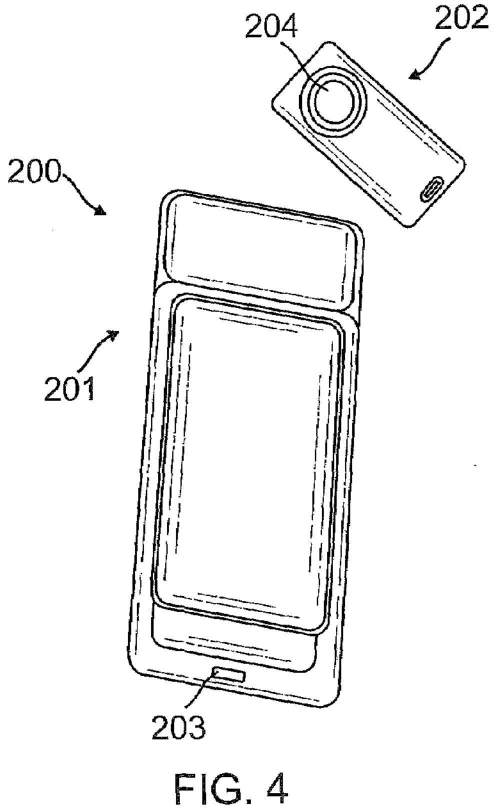
FIG. 4
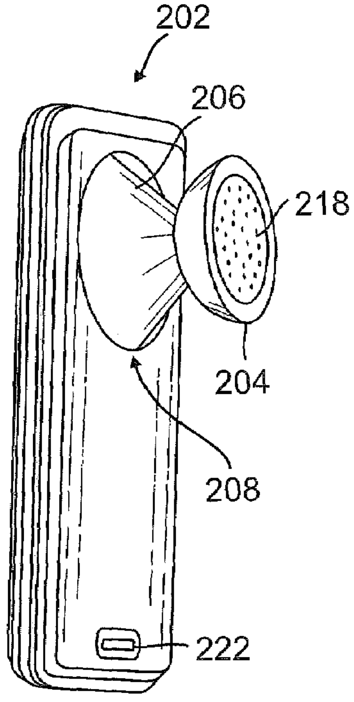
FIG. 5

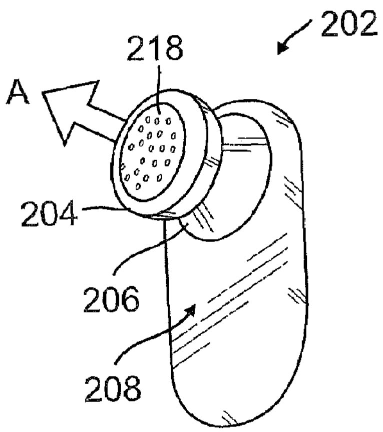
FIG. 6A
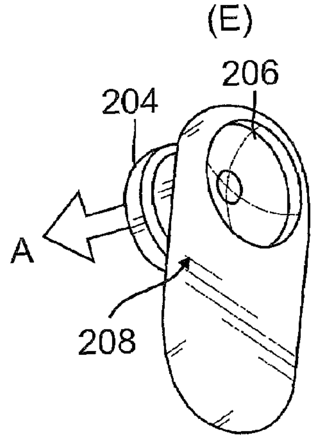
FIG. 6B1
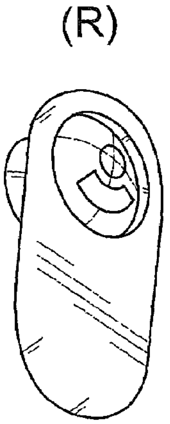
FIG. 6B2
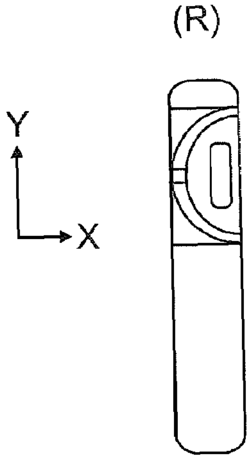
FIG. 6C1
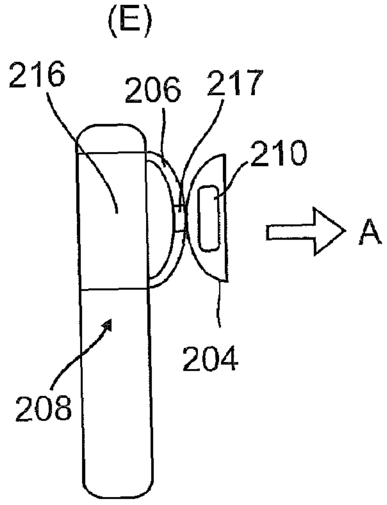
FIG. 6C2

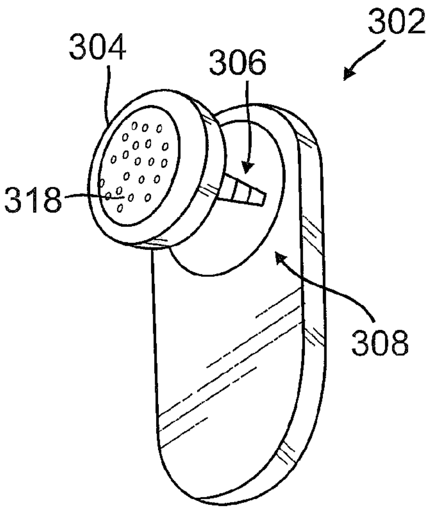
FIG. 7A
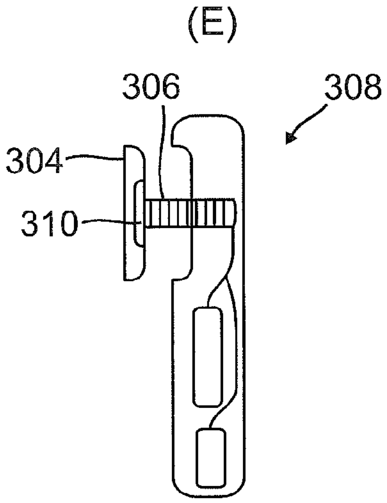
FIG. 7B1
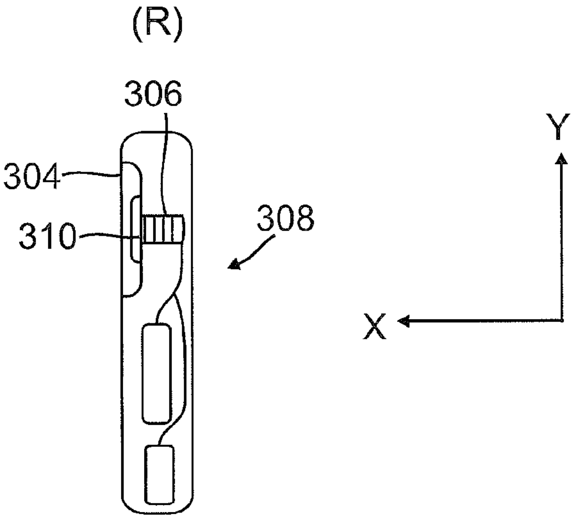
FIG. 7B2

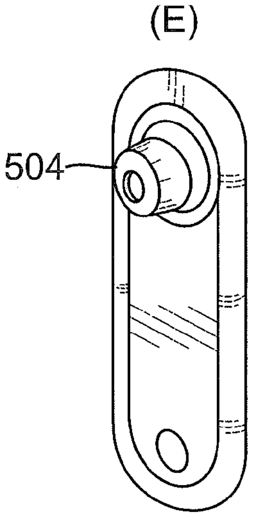
FIG. 10A1
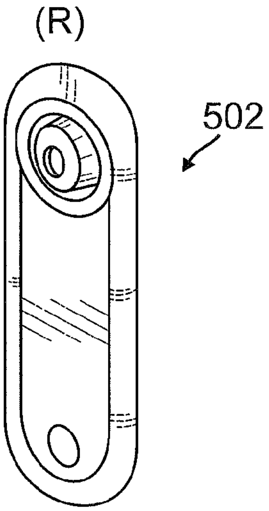
FIG. 10A2
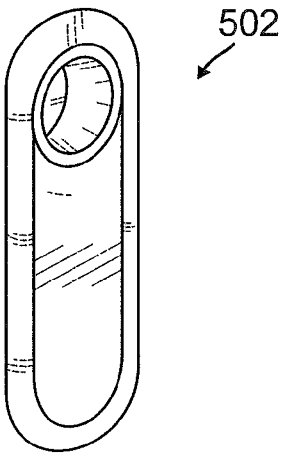
FIG. 10B
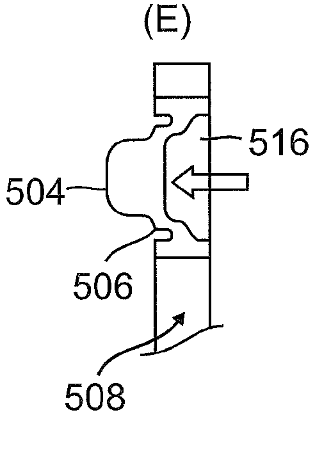
FIG. 10C1
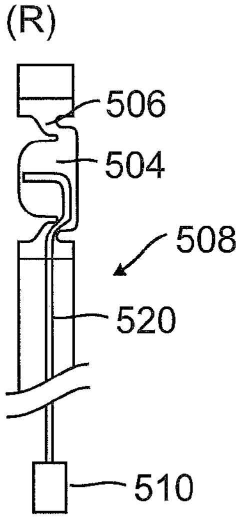
FIG. 10C2

HEADSET WITH A RETRACTABLE SPEAKER PORTION

BACKGROUND OF THE INVENTION

1. Field of Invention

This invention generally relates to headsets containing earphones and, more particularly, to an "in-the-ear" type headset apparatus with a retractable speaker capsule or port allowing for improved form factor.

2. Discussion of the Related Art

Headsets are gaining in popularity in and out of the workplace as more and more users either have jobs requiring that they spend a substantial amount of time on the telephone or users simply desire to listen to audio or speak on the telephone with their hands free to perform other tasks.

One type of headset, which can incorporate one or two earphones for monaural or stereo listening, is known as an "in-the-ear" type headset or "earbud" headset, which employs earphones that can be disposed in the lower concha area of the ear. Such devices can be used for delivering radio, stereo, two-way, and/or telephonic-type communications to a user.

Currently, earbud headsets have a fixed speaker capsule or port that fits into the cavum of the ear. This capsule or port is rigidly fixed to the remainder of the headset, which remains substantially outside of the cavum. Traditionally, the profile of these types of headsets has a thickness of about 10 mm or more from the speaker face to the headset outer surface, which is seen when worn. As miniaturization increasingly allows for smaller headsets, it is advantageous to reduce the profile form factor of these headsets for integration into a cellular phone or simply slimmer more convenient storage.

Therefore, there is a need in the art for a headset apparatus with reduced profile form factor allowing for convenient storage and/or integration with a handset.

SUMMARY

The present invention provides an earbud headset with an extendable and retractable speaker portion allowing for a thin profile form factor (e.g., about 7 mm). Advantageously, the present invention allows for more convenient storage and/or integration with a handset such that a user may carry the handset and headset much like a single item.

According to one embodiment of the present invention, an earbud headset is provided, the headset including a base portion; a speaker portion for transmitting sound; and a neck portion coupled between the base portion and the speaker portion, the neck portion capable of extending from and retracting into the base portion.

According to another embodiment of the present invention, an earbud headset is provided, the headset including a base portion including an antenna, a battery, and a microphone; a neck portion coupled to the base portion, the neck portion capable of extending from and retracting into the base portion; and a speaker portion coupled to the neck portion, the speaker portion capable of extending from and retracting into the base portion.

According to another embodiment of the present invention, a handset including an earbud headset is provided, the handset including an earbud headset as described above, and a handset body detachably coupled to the base portion of the earbud headset, the handset body including a microphone operable with the transducer.

According to another embodiment of the present invention, a method of using an earbud headset is provided, the method including providing an earbud headset as described above, extending the speaker portion from the base portion, placing the speaker portion in a user's ear, and operating the transducer in conjunction with the microphone.

According to yet another embodiment of the present invention, a method of using a handset including an earbud headset is provided, the method including providing an earbud headset as described above, and providing a handset body detachably coupled to the base portion of the earbud headset, the handset body including a second microphone. The method further includes operating the transducer of the headset in conjunction with the second microphone of the handset body.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF DRAWINGS

FIGS. 2A and 2B illustrate a perspective view of an earbud headset with a retracted speaker portion and an extended speaker portion, respectively, in accordance with an embodiment of the present invention.

FIGS. 3A1 and 3B1 illustrate a perspective view and a sectional view, respectively, of a speaker capsule, neck portion, and partial base portion, of an earbud headset in an extended position in accordance with an embodiment of the present invention.

FIGS. 3A2 and 3B2 illustrate a perspective view and a sectional view, respectively, of a speaker capsule, neck portion, and partial base portion, of an earbud headset in a retracted position in accordance with an embodiment of the present invention.

FIG. 4 illustrates a perspective view of an earbud headset and corresponding handset in accordance with another embodiment of the present invention.

FIG. 5 illustrates a perspective view of an earbud headset with an extended speaker portion in accordance with an embodiment of the present invention.

FIGS. 6A, 6B1, and 6B2 illustrate perspective views of the earbud headset of FIG. 5 in accordance with an embodiment of the present invention.

FIGS. 6C1 and 6C2 illustrate sectional views of the earbud headset of FIG. 5 with a retracted speaker capsule and an extended speaker capsule, respectively, in accordance with an embodiment of the present invention FIG. 7A illustrates a perspective view of an earbud headset in accordance with yet another embodiment of the present invention.

FIGS. 7B1 and 7B2 illustrate sectional views of the earbud headset of FIG. 7A in accordance with an embodiment of the present invention.

FIGS. 10A1, 10A2, and 10B illustrate perspective views of an earbud headset in accordance with yet another embodiment of the present invention.

FIGS. 10C1 and 10C2 illustrate sectional views of the earbud headset of FIGS. 10A1 and 10A2 with an extend speaker port and a retracted speaker port, respectively, in accordance with an embodiment of the present invention Embodiments of the present invention and their advantages are best understood by referring to the detailed description that follows. It should be appreciated that like reference numerals are used to identify like elements illustrated in one or more of the figures. It should also be appreciated that the figures may not be necessarily drawn to scale.

DETAILED DESCRIPTION

The present invention provides an earbud headset with an extendable and retractable speaker portion (e.g., a speaker capsule or a speaker port) allowing for a thin profile form factor (e.g., about 7 mm from the speaker face to the headset outer surface). A speaker portion interfaces with the user's ear and is used to transfer sound from a speaker or audio transducer to the user's ear canal. The speaker portion may or may not include the transducer itself. A speaker capsule is defined in this document as including (e.g., encasing) a transducer, and a speaker port is defined in this document as a structure that interfaces with the user's ear to serve as a pathway for sound from a transducer but does not include the transducer itself. The speaker portion may be extended from or retracted into a base portion by a neck portion. In one example, the neck portion may be selected from the group consisting of a diaphragm, a telescoping rod, and a spring-loaded overcenter cam post. Advantageously, the present invention allows for more convenient storage and/or integration with a handset such that a user may carry the phone and headset as one item.

Figure 1:
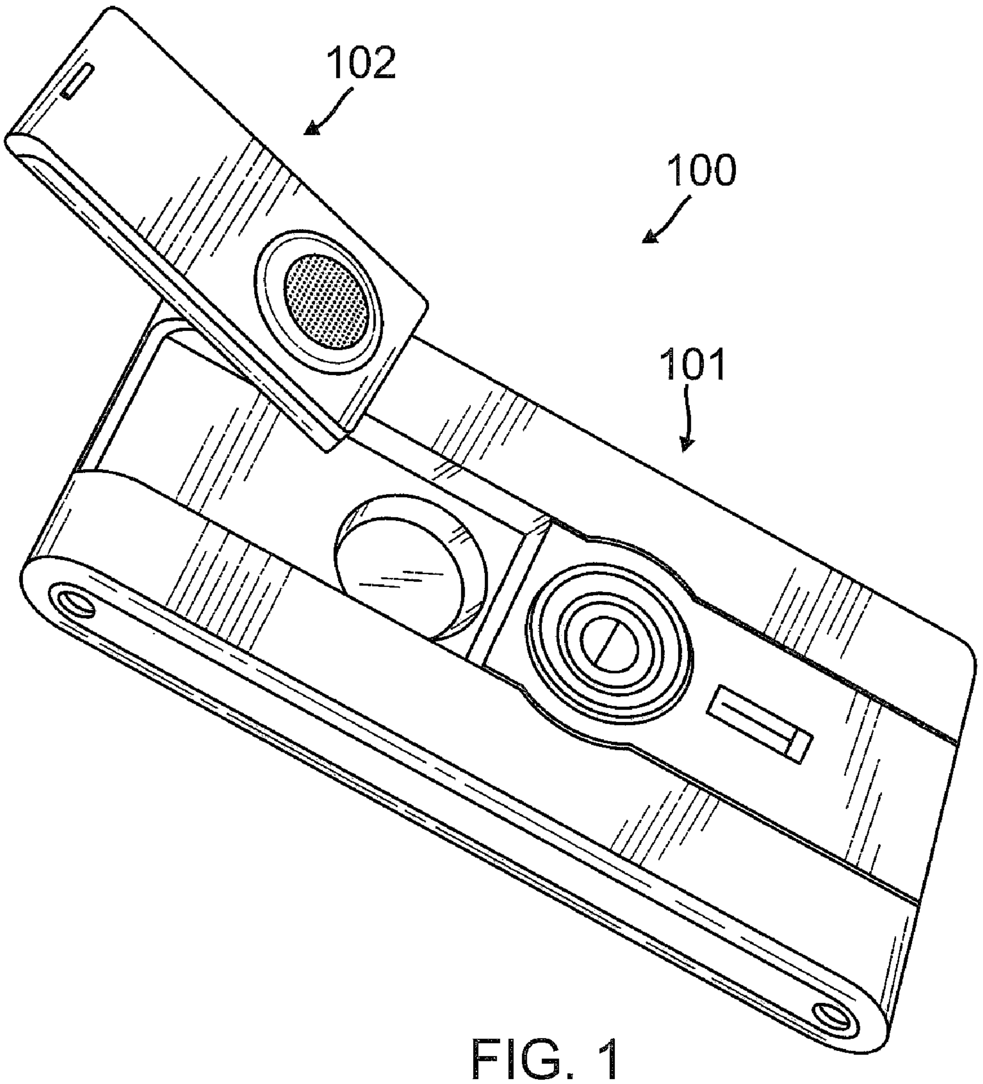
FIG. 1 illustrates a perspective view of an earbud headset and corresponding handset in accordance with an embodiment of the present invention.

FIG. 1 illustrates a perspective view of a system 100 including an earbud headset 102 and a corresponding handset 101 in accordance with an embodiment of the present invention. Handset 101 is one of various communication devices and may include but is not limited to a cellular telephone, a corded handset of a conventional POTS telephone, or a mobile device such as a PDA. In one example, a wireless headset working in conjunction with a corresponding radiotelephone apparatus is described in U.S. Pat. No. 5,590,417, which is incorporated by reference herein for all purposes. When the headset is attached to the handset, the headset and handset electrically communicate. When the headset is detached from the handset, the headset wirelessly communicates with the handset.

FIGS. 2A and 2B illustrate a perspective view of earbud headset 102 with a retracted speaker portion and an extended speaker portion, respectively, in accordance with an embodiment of the present invention. In this embodiment, headset 102 includes a speaker capsule 104, a neck portion 106, and a base portion 108.

FIGS. 3A1 and 3B1 illustrate a perspective view and a sectional view, respectively, of speaker capsule 104, neck portion 106, and a section of base portion 108 of earbud headset 102 in an extended position (E) in accordance with an embodiment of the present invention. FIGS. 3A2 and 3B2 illustrate a perspective view and a sectional view, respectively, of speaker capsule 104, neck portion 106, and a section of base portion 108 of earbud headset 102 in a retracted position (R) in accordance with an embodiment of the present invention.

Speaker capsule 104 includes a transducer 110 (FIGS. 3B1 and 3B2), which can be any type of electromagnetic, piezoelectric, or electrostatic type of driving element, or a combination thereof, or another form of driving element, for generating sound waves from the output face of the transducer. In one embodiment, transducer 110 receives electric signals from an antenna 112 via wires. The signals may be digital or analog in nature. Transducer 110 converts an electric signal to an audio signal and directs the audio signal toward a faceplate. In another embodiment, transducer 110 may receive signals through wireless communication channels, such as by Bluetooth™ protocols and hardware, in one example.

Speaker capsule 104 may further include a faceplate 118 (FIGS. 3A1 and 3A2) having a pattern of apertures for conveying sound from transducer 110 to the user's ear. Faceplate 118 is used to direct sound from transducer 110 toward the user's eardrum, regardless of whether earbud headset 102 is in the right ear or the left ear. It should be understood that the invention is not limited to a specific faceplate and any appropriate faceplate may be used to direct sound from the transducer to the user's eardrum. Speaker capsule 104 is operably coupled to neck portion 106.

Neck portion 106 is capable of extending from and retracting into base portion 108. In this embodiment, neck portion 106 is provided as a diaphragm with sides that fold inwardly (similar to a concave shape) when in the retracted position (R) (FIG. 3B2), and that fold outwardly (similar to a convex shape) to provide a cavity 116 when in the extended position (E) (FIG. 3B1). Neck portion 106 may be moved from the retracted position to the extended position by a force provided behind speaker capsule 104 in the direction of arrow A, for example provided by a finger of the user which may fit into cavity 116. Neck portion 106 may be formed using any of a number of commercially available, high performance thermoplastics, such as ABS and propylene, all of which are well known to those skilled in the art. Many different materials with similar properties could also be used. Neck portion 106 is operably coupled to base portion 108.

In one embodiment, base portion 108 may include antenna 112 and a battery 114 (FIG. 3B2). Antenna 112 may be a Bluetooth antenna in one example. Base portion 108 may further include a housing 109, such as that shown in FIG. 2B, that may house several elements, including but not limited to antenna 112 and battery 114, but also wires, a processor, a printed circuit board, an amplifying means, and a gain control means. Wires from the antenna and/or processor to the transducer can carry signals, which can be converted to an audio signal by transducer 110. The housing may also be configured to detachably couple to handset 101 (FIG. 1).

Advantageously, neck portion 106 and coupled speaker capsule 104 are capable of extending in a direction substantially perpendicular (shown by axis X in FIG. 3B2) to a lengthwise plane of base portion 108 (shown by axis Y in FIG. 3B2) as shown in FIGS. 2B, 3A1, and 3B1. Neck portion 106 and coupled speaker capsule 104 are also capable of retracting in a direction substantially perpendicular (shown by axis X in FIG. 3B2) to a lengthwise plane of base portion 108 (shown by axis Y in FIG. 3B2) as shown in FIGS. 1, 2A, 3A2, and 3B2, such that speaker capsule 104 is substantially completely retracted into base portion 108 with negligible speaker capsule surfaces protruding from base portion 108. Accordingly, a small form factor (e.g., about 7 mm from the speaker faceplate to the headset outer housing surface) is made available for storage of headset 102 and/or integration with handset 101.

Earbud headset 102 may be used for either monaural or stereo listening by applying an earbud headset 102 to one or each ear of a user. It is also noted that earbud headset 102 may receive signals from various audio sources.

In headsets used for telephonic or similar type communications, a microphone may be positioned in the vicinity of the user's mouth, usually by a tubular extension, voice tube, boom, or in-line pod, for receiving the user's voice and transmitting it over a telecommunications line. Referring again to FIGS. 2A and 2B, earbud headset 102 may include a microphone 122 to enable two-way voice communication by the user in accordance with an embodiment of the present invention.

Headset 102 may further include volume control and/or a call switch by including a circuit board operably embedded into the base portion and operably connected to the transducer to allow for quick access to volume control and/or actuation of the answer/end call function. These controls may be located on a back portion of the base.

Referring now to FIG. 4, a perspective view is shown of a system 200 including an earbud headset 202 and a corresponding handset 201 in accordance with another embodiment of the present invention. Similar reference numerals are used to identify like elements illustrated in and described above with respect to FIGS. 1-3B2. Similar elements have similar structures and/or functions as described above.

Referring again to FIG. 4, earbud headset 202 may be docked in handset 201. In the docked configuration, speaker capsule 204 may be electrically coupled to or associated with circuitry in handset 201. Microphone 203 may be activated in the docked configuration, and microphone 222 of earbud headset 202 may be deactivated. Thus handset 201 may not require its own speaker when used with docked headset 202.

FIG. 5 illustrates a perspective view of earbud headset 202 of FIG. 4 with an extended speaker capsule 204, a neck portion 206, and a base portion 208, in accordance with an embodiment of the present invention.

FIGS. 6A, 6B1, and 6B2 illustrate perspective views of earbud headset 202 of FIGS. 4 and 5 in accordance with an embodiment of the present invention. FIGS. 6C1 and 6C2 illustrate sectional views of earbud headset 202 with speaker capsule 204 in a retracted position (R) and an extended position (E), respectively, in accordance with an embodiment of the present invention.

Speaker capsule 204 includes a transducer 210 (FIGS. 6C1 and 6C2) and may include a faceplate 218 (FIGS. 5 and 6A) having a pattern of apertures for conveying sound from transducer 210 to the user's ear.

Speaker capsule 204 is operably coupled to neck portion 206. In one example, speaker capsule 204 may be movably coupled to neck portion 206, in one example by a joint 217 allowing for movement of speaker capsule 204 with respect to neck portion 206. In another example, speaker capsule 204 is movably coupled to an end of neck portion 206 by a ball-and-socket joint such that speaker capsule 204 is capable of motion along various axes. Advantageously, a ball-and-socket joint allows for greater freedom of motion for speaker capsule 204 and thus allows for greater conformability to the shape and orientation of a user's ear resulting in enhanced acoustic coupling. One example of a ball-and-socket joint that may be used is described in U.S. Pat. No. 5,761,298, issued on Jun. 2, 1998, to Davis et al. for "Communications Headset With Universally Adaptable Receiver and Voice Transmitter," which is commonly assigned and incorporated herein by reference for all purposes.

Neck portion 206 is capable of extending from and retracting into base portion 208. In this embodiment, neck portion 206 is provided as a diaphragm with sides that flex or "pop" inwardly (similar to a concave shape) when in the retracted position (R) (FIGS. 6B2 and 6C1), and that flex or "pop" outwardly (similar to a convex shape) to provide a cavity 216 when in the extended position (E) (FIGS. 5, 6A, 6B1, and 6C2). This movement of neck portion 206 is similar to an "oilcan" effect when an oilcan is squeezed from a first position to a second position to provide a quantity of oil from the can. Neck portion 206 may be moved from the retracted position to the extended position by a force provided behind speaker capsule 204 in the direction of arrow A, for example provided by a finger of the user which may fit into cavity 216. Neck portion 206 is operably coupled to base portion 208.

In one embodiment, base portion 208 may include an antenna and/or a battery. Base portion 208 may further include a housing configured to detachably couple to handset 201 (FIG. 4).

Advantageously, neck portion 206 and coupled speaker capsule 204 are capable of extending in a direction substantially perpendicular (shown by axis X in FIGS. 6C1 and 6C2) to a lengthwise plane of base portion 208 (shown by axis Y in FIGS. 6C1 and 6C2) as shown in FIG. 6C2. Neck portion 206 and coupled speaker capsule 204 are also capable of retracting in a direction substantially perpendicular (shown by axis X in FIGS. 6C1 and 6C2) to a lengthwise plane of base portion 208 (shown by axis X in FIGS. 6C1 and 6C2) as shown in FIG. 6C1, such that speaker capsule 204 is substantially completely retracted into base portion 208 with negligible speaker capsule surfaces protruding from base portion 208. Accordingly, a smaller form factor is made available for storage of headset 202 and/or integration with handset 201.

FIG. 7A illustrates a perspective view of an earbud headset 302 in accordance with yet another embodiment of the present invention. Headset 302 includes a speaker capsule 304, a neck portion 306, and a base portion 308. FIGS. 7B1 and 7B2 illustrate sectional views of earbud headset 302 of FIG. 7A with speaker capsule 304 in an extended position (E) and a retracted position (R), respectively, in accordance with an embodiment of the present invention. Similar reference numerals are used to identify like elements illustrated in and described above with respect to FIGS. 1-6C2. Similar elements have similar structures and/or functions as described above.

Speaker capsule 304 includes a transducer 310 (FIGS. 7B1 and 7B2) and may include a faceplate 318 (FIG. 7A) having a pattern of apertures for conveying sound from transducer 310 to the user's ear. Speaker capsule 304 is operably coupled to neck portion 306. In one example, speaker capsule 304 may be movably coupled to neck portion 306, in one example by a joint allowing for rotational movement of speaker capsule 304 with respect to neck portion 306.

Neck portion 306 is capable of extending from and retracting into base portion 308. In this embodiment, neck portion 306 is provided as a telescoping post that can telescope into an extended position (E) (FIG. 7B1) or collapse into a retracted position (R) (FIG. 7B2). Neck portion 306 is operably coupled to base portion 308.

In one embodiment, base portion 308 may include an antenna and/or a battery. Base portion 308 may further include a housing configured to detachably couple to a handset (not shown).

Advantageously, neck portion 306 and coupled speaker capsule 304 are capable of extending and retracting along a direction substantially perpendicular (shown by axis X in FIGS. 7B1 and 7B2) to a lengthwise plane of base portion 308 (shown by axis Y in FIGS. 7B1 and 7B2), such that speaker capsule 304 is substantially completely retracted into base portion 308 with negligible speaker capsule surfaces protruding from base portion 308. Accordingly, a smaller form factor is made available for storage of headset 302 and/or integration with a handset.

Figure 8A:
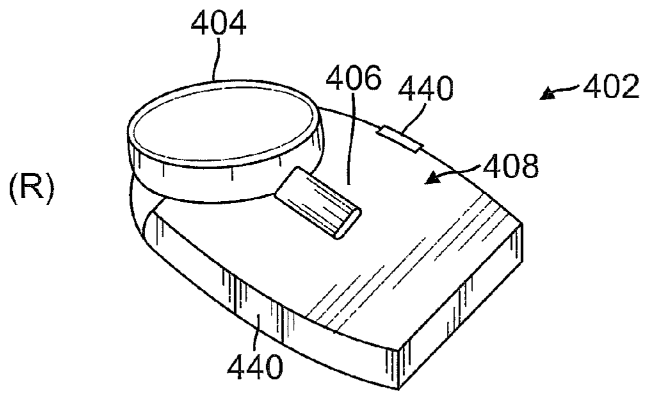
FIGS. 8A and 8B illustrate a perspective view of an earbud headset with a retracted speaker capsule and an extended speaker capsule, respectively, in accordance with yet another embodiment of the present invention.
Figure 8B:
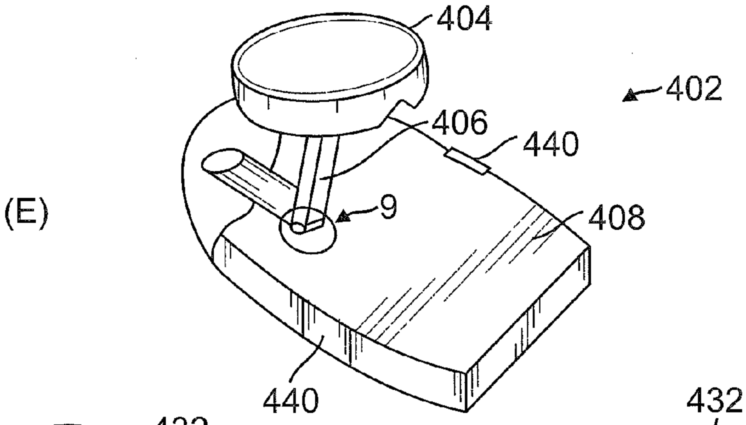

FIGS. 8A and 8B illustrate a perspective view of an earbud headset 402 with a retracted speaker capsule 404 and an extended speaker capsule 404, respectively, in accordance with yet another embodiment of the present invention. Speaker capsule 404 of earbud headset 402 is operably coupled to a neck portion 406, which is operably coupled to a base portion 408. The retracted position is denoted by reference (R) and the extended position is denoted by reference (E).

Speaker capsule 404 is operably coupled to neck portion 406, and in one example, speaker capsule 404 may be movably coupled to neck portion 406 via a hinge joint allowing for rotational movement of speaker port 404 with respect to neck portion 406.

Figure 9A:
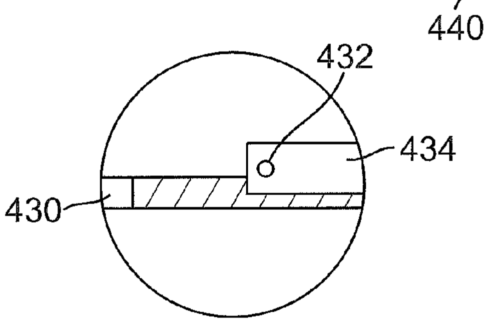
FIGS. 9A through 9C illustrate an enlarged view of a spring mechanism coupling a neck portion to a base portion of the headset of FIGS. 8A and 8B in accordance with an embodiment of the present invention.
Figure 9B:
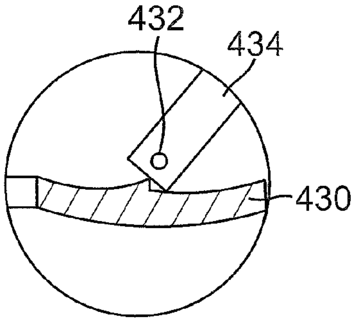
Figure 9C:
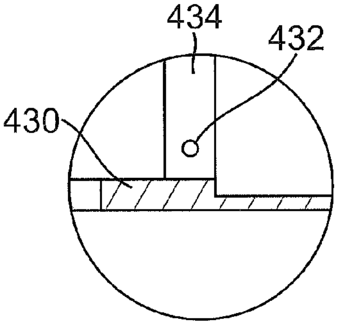

In this embodiment, neck portion 406 includes a spring loaded overcenter cam on a post attached to speaker capsule 404. Buttons 440 on both sides of base portion 408 may be used to snap the post into the overcenter position. FIGS. 9A through 9C illustrate an enlarged view of a spring mechanism coupling neck portion 406 to base portion 408 of the headset of FIGS. 8A and 8B. A spring 430 is normally in an unstressed state (FIGS. 9A and 9C) and allows for the toggling of a post 434 about a high stress pivot point 432. In another embodiment, neck portion 406 may be coupled to base portion 408 by a hinge joint which is not spring loaded.

FIGS. 10A1, 10A2, and 10B illustrate perspective views of an earbud headset 502 in accordance with yet another embodiment of the present invention. Earbud headset 502 includes a speaker port 504, a neck portion 506, and a base portion 508. FIGS. 10C1 and 10C2 illustrate sectional views of the earbud headset of FIGS. 10A1 and 10A2 with an extended speaker port 504 and a retracted speaker port 504, respectively, in accordance with an embodiment of the present invention. The retracted position is denoted by reference (R) and the extended position is denoted by reference (E).

In this embodiment, speaker port 504 does not include a transducer as with the speaker capsule in the embodiments described above. Instead, speaker port 504 acts to transfer sound via a tubing 520 from a transducer 510 which is apart from the speaker port, for example being placed in base portion 508. Speaker port 504 may be comprised of a number of commercially available, high performance polymers or gels that may conform to the ear, all of which are well known to those skilled in the art. Many different materials with similar properties could also be used. It is noted that in the previous embodiments described above, a speaker capsule is interchangeable with a speaker port unless otherwise noted.

The above-described embodiments of the present invention are merely meant to be illustrative and not limiting. It should also be understood that numerous modifications and variations are possible in accordance with the principles of the present invention. Accordingly, the scope of the invention is defined only by the following claims.

What is claimed is:

1. An earbud headset, comprising:

a base portion;

an earbud speaker portion for transmitting sound; and a neck portion including a diaphragm operably coupled to the base portion and the earbud speaker portion, wherein the diaphragm is configured to extend from or retract into the base portion to move the earbud speaker portion away from or toward the base portion, and further wherein the diaphragm includes a finger cavity adjacent the speaker portion in an extended configuration.

2. The headset of claim 1, wherein the base portion includes one of a battery, an antenna, a microphone, a gain control means, and an amplifying means.

3. The headset of claim 1, wherein the base portion includes a housing configured to be detachably coupled to a handset.

4. The headset of claim 1, wherein the speaker portion encases a transducer in a speaker capsule.

5. The headset of claim 1, wherein the speaker portion is a speaker port not including a transducer.

6. The headset of claim 1, wherein the speaker portion is configured to contact a lower concha of a user's ear.

7. The headset of claim 1, wherein the speaker portion is coupled to the neck portion by a joint selected from the group consisting of a ball-and-socket joint, a hinge, and a static joint.

8. The headset of claim 1, wherein the neck portion extends or retracts along a direction substantially perpendicular to a plane of the base portion.

9. An earbud headset, comprising:

a base portion;

an earbud speaker portion for transmitting sound; and a neck portion including a post operably coupled to the base portion and the earbud speaker portion, wherein the post is configured to extend from or retract into the base portion to move the earbud speaker portion away from or toward the base portion along an arcuate path.

10. The headset of claim 9, wherein the base portion includes a housing configured to be removably coupled to a handset.

11. The headset of claim 9, wherein the speaker portion encases a transducer in a speaker capsule.

12. The headset of claim 9, wherein the speaker portion is a speaker port not including a transducer.

13. The headset of claim 9, wherein the speaker portion is configured to contact a lower concha of a user's ear.

14. The headset of claim 9, wherein the speaker portion is coupled to the neck portion by a joint selected from the group consisting of a ball-and-socket joint, a hinge, and a static joint.

15. The headset of claim 9, wherein the post is a spring-loaded post.

16. The headset of claim 9, wherein the base portion includes one of a battery, an antenna, a microphone, a gain control means, and an amplifying means.

17. An earbud headset, comprising:

a base portion;

an earbud speaker portion for transmitting sound; and a neck portion including a telescoping post operably coupled to the base portion and the speaker portion, wherein the telescoping post is configured to extend from or retract into the base portion along a direction substantially perpendicular to a lengthwise plane of the base portion.

18. The headset of claim 17, wherein the base portion includes one of a battery, an antenna, a microphone, a gain control means, and an amplifying means.

19. The headset of claim 17, wherein the base portion includes a housing configured to be detachably coupled to a handset.

20. The headset of claim 17, wherein the speaker portion encases a transducer in a speaker capsule.

21. The headset of claim 17, wherein the speaker portion is a speaker port not including a transducer.

22. The headset of claim 17, wherein the speaker portion is configured to contact a lower concha of a user's ear.

23. The headset of claim 17, wherein the speaker portion is coupled to the neck portion by a joint selected from the group consisting of a ball-and-socket joint, a hinge, and a static joint.

24. A method of operating an earbud headset, comprising:

providing an earbud headset including:

a base portion, an earbud speaker portion for transmitting sound, and a neck portion including a diaphragm coupled to the base portion and the speaker portion, wherein the diaphragm is configured to extend from or retract into the base portion;

extending the diaphragm from the base portion to move the speaker portion away from the base portion, leaving the diaphragm with a finger cavity adjacent the speaker portion in an extended configuration; and placing the speaker portion in a user's ear.

25. The method of claim 24, further comprising: retracting the speaker portion into the base portion for storage.

26. A method of operating an earbud headset, comprising:

providing an earbud headset including:

a base portion, an earbud speaker portion for transmitting sound, and a neck portion including a post coupled to the base portion and the speaker portion, wherein the post is configured to extend from or retract into the base portion;

extending the speaker portion from the base portion along an arcuate path; and placing the speaker portion in a user's ear.

27. A method of operating an earbud headset, comprising:

providing an earbud headset including:

a base portion, an earbud speaker portion for transmitting sound, and a neck portion including a telescoping post coupled to the base portion and the speaker portion, wherein the telescoping post is configured to extend from or retract into the base portion;

extending the speaker portion from the base portion by telescoping the telescoping post along a direction substantially perpendicular to a lengthwise plane of the base portion; and placing the speaker portion in a user's ear.

* * * * *